Jan. 4, 1944.  L. R. NELSON  2,338,666
METHOD OF SECURING FITTINGS TO HOSE-ENDS
Filed June 16, 1941
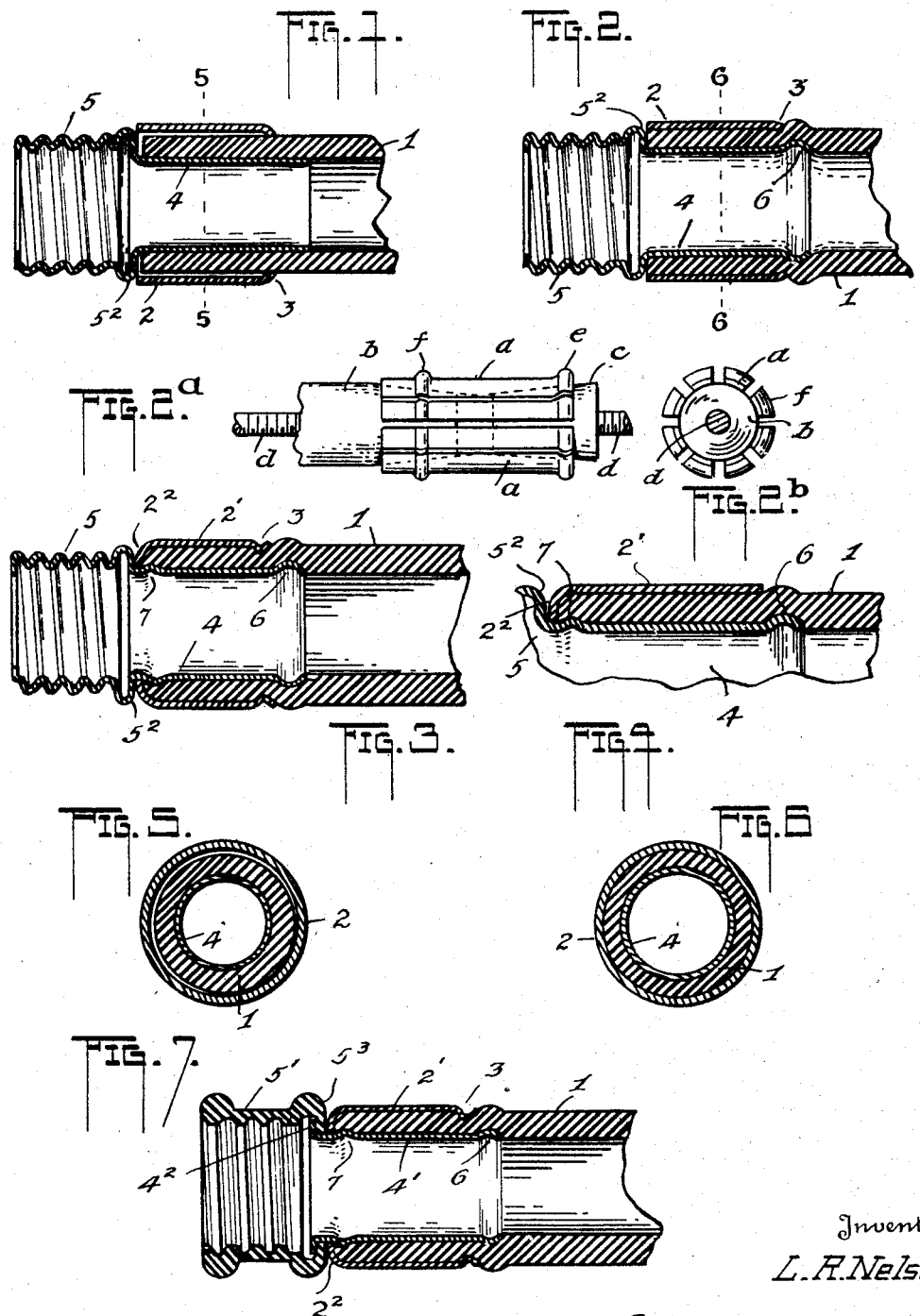
Inventor
L. R. Nelson,
By L. M. Hurlbut
Attorney Patented Jan. 4, 1944

2,338,666

UNITED STATES PATENT OFFICE 2,338,666

METHOD OF SECURING FITTINGS TO HOSE-ENDS

Lewen R. Nelson, Peoria, Ill.

Application June 16, 1941, Serial No. 398,278

6 Claims. (Cl. 29—88.2)

This invention relates to a method of attaching hose fittings permanently to hose-ends, as well as to the article resulting from such method.

More particularly the invention is directed to a method of attaching hose fittings, wherein either a tubular male or female coupling part is introduced into a hose-end, the hose-end being encompassed by an outer ferrule and clamped between said ferrule and the tubular part, the whole providing a structure highly efficient.

One of the important objects of the invention is a method of employing an outer ferrule for the hose-end, and the introduction of a tubular part into the bore of the latter followed by expanding the said tubular part to compress the wall of the hose between it and the ferrule while including on the ferrule, or the tubular part, or both, certain portions to engage in the said wall of the hose at certain positions to provide friction for preventing separation of the parts.

Another important object is to provide a method of connecting a fitting to a hose wherein a hose-end is encircled by a band or ferrule the latter constituting an outer abutment portion, and a tubular portion or expansible shank is inserted into the hose bore at said end, and by means of a tool, expanding said tubular portion thereby forcing the hose wall outwardly against the band or ferrule. Thus said tool creates an enlargement of said portion and of said hose beyond and adjacent that end of the ferrule lying farthest from the hose-terminus, to furnish a stop for preventing the thus compressed hose-wall, from slipping over the said head of said portion, and, further, that by thus compressing the hose wall between the portion and ferrule, thereby reducing the space occupied by the hose material and making it more compact and rendering it practically non-stretchable, it cannot slip relative to last named parts when a pull or strain is exerted thereon.

Important, also, is that of providing an inner and an outer tubular part between which to introduce a hose-end, and expanding the inner part to carry a portion thereof toward the outer part into position adjacent a portion of that member for preventing separation of the said tubular parts.

Again, an object is to provide an outer band or ferrule to encircle a hose-end, and an inner tubular part to lie in the bore of the said hose-end, said band or ferrule near that end thereof lying farthest from the terminus of the hose having a construction to reduce its internal diameter, while being flared outwardly at said end to permit free entry into said ferrule of said hose-end.

Another object is the ability to expand the said tubular part to such an extent that the diameter of the bore thereof can be at least equal to the diameter of the bore of the hose to the end that a full and unrestricted flow of a commodity is assured with a hose of a given bore diameter.

Again, an object is to utilize a ferrule as a continuous unyielding band exteriorly of the hose-end, and encircling it, the same having a reduced portion to engage in the outer wall of the hose-end, and to create on a tubular portion inserted into the bore of the hose an abutment to force the wall of the hose outwardly into position adjacent the named reduced portion of the named ferrule, the abutment and reduced portion co-operating to provide a permanent securing of the several parts relatively.

In order that my method as well as the involved structure may be understood the appended drawing is provided wherein:

Figure 1 is a longitudinal section of part of a hose, an introduced male coupling part, and an outer ferrule assembled ready for operation thereon by my method;

Figure 2 is likewise a longitudinal section of the structure of Figure 1 showing the changed relation of the parts following the application of my said method;

Figures 2$^a$ and 2$^b$ are respectively a side elevation and an end elevation of an expander tool;

Figure 3 is similar to Figures 1 and 2 showing a slightly different form of an outer ferrule of those said figures;

Figure 4 is a fragmentary illustration, in longitudinal section, much enlarged, of part of a hose-end and parts shown in some of the previous figures but wherein an outer ferrule is illustrated in a slightly different form;

Figures 5 and 6 are transverse sections on lines 5—5 and 6—6 of Figures 1 and 2, respectively, and Figure 7 is similar to Figure 3 but wherein a female coupling part is illustrated in place of the male part shown in the latter figure.

In Figures 1 and 2 a portion of a hose 1 is shown over which is slipped a tubular member or ferrule 2, also shown in Figures 5 and 6, and in the interest of clarity to be referred to as its "inner end," may even be reduced in diameter to form an annular part 3 but whose bore will very readily permit said member to be placed over the hose-end.

A tubular portion 4 as a part of a male coupling part 5 is introduced into the bore of the hose and has substantially the length and position shown, and is extended beyond the plane of the inner terminus of the named ferrule, and said portion may have an overall diameter no greater than the internal diameter of the hose so as to be easily slipped into place.

The parts having been thus assembled the whole is now ready to be operated upon according to the method now to be described. That is to say, an expanding tool of any suitable type is introduced into the tubular portion 4 by which to at once expand the named portion 4 and to create an internal groove providing a corresponding annular abutment portion 6 outward from the named annular part 3 of the ferrule. Similarly an annular abutment portion 7 may be formed near the part 5 but within the confines of said ferrule 2, and so located as to prevent longitudinal movement of the ferrule and tubular portion relatively.

The expanding tool may, for example, be according to that shown in Figures $2^a$ and $2^b$ wherein a series of segments $a$ are assembled about and upon a pair of tapering members $b$, $c$, through which a thread-bar $d$ may extend; the rotation of which thread-bar will cause the segments to move radially into engagement with the tubular portion 4 as the members approach each other along said thread-bar, said segments $a$ each carrying an extension $e$ which creates the abutment 6, said segments also carrying, when desired, an extension $f$ to create the abutment 7.

In the expanding act the named portion 4, in expanding it will be noted, has forced the wall of the hose outwardly from its original or normal unstrained position toward and compressing it against the ferrule shown in Figure 1, the annular part 3 being embedded in the said wall. Further expansion now compresses the hose wall between the said portion and the ferrule to a position in which the bore of the said portion can be at least equal to the bore of the hose as best shown in Figure 4, for example, and at the same time the abutment 6 is created just outward from the ferrule-end at 3 thus creating what may be termed a "buckling" of the hose wall at that position. It will be obvious that the abutment 6 is located at a zone between the end of said interior portion and the point intersected by a line drawn from the adjacent end of said exterior tubular portion at right angles to the bore of said hose. Since the material has been compressed, it is clear that the hose and tube are permanently fixed relatively since to pass over the abutment 6 the compressed hose and thus practically hard material would be required to change its form continuously during a pull thereon. The diameter and peripheral dimension of the abutment 6 is greater than any part of the tubular portion 4 when the portion is fitted into the hose. This is a factor in creating the above mentioned buckle.

Attention is drawn to the fact that in Figures 3, 4 and 7 the ferrule 2 at its outer end has a flange $2^2$ turned inwardly thereon to closely approach the inner tubular portion. Also, that the abutment 7 of the latter lies close to said flange and that, therefore, the ferrule cannot shift relative to the said tubular portion in any pull or strain exerted lengthwise of the hose from the fact that said abutment is of greater diameter than the opening or bore of said flange. Said flange and the abutment 7 thus cooperate in fixing the hose-end, the ferrule, and portion 4 in positive manner relatively.

The tubular portion 4' of Figure 7 is akin to that of certain of the earlier figures except that its outer extremity accommodates a swivel nut 5' as distinguished from the male portion 5.

It is noted that the said male portion in Figures 3 and 4 includes an outwardly flared flange $5^2$ as part of the tubular portion 4, and that the nut 5' likewise includes a flange $5^3$ with which engages a terminal flange $4^2$ of the tubular portion 4', so that in either form of fitting the parts thereof are inseparable since the inturned flange $2^2$ of the tubular portion lies between the abutment 7 and the named flange of the male portion, or the nut, as the case may be. The several figures show various forms of the ferrule that are open for use, as will be understood, the said abutment 7 being chosen for such forms as may be desired.

I claim:

1. A method of securing a hose fitting to a hose end which method comprises providing the outer end portion of a hose with an encircling exterior tubular element having at one end thereof an inturned radially extending flange so that the face of the flange substantially extends across the end wall of the hose, applying to the same end of the hose a terminal connector having an extension which is longer than the length of said exterior tubular element by inserting said extension as an interior portion into the hose until its inner end is beyond that end of the exterior tubular element farthest from that same end of the hose, thereafter annularly expanding said interior portion at a zone between the end thereof and a point intersected by a line drawn from the adjacent end of said exterior tubular portion at right angles to the bore of said hose, and annularly expanding the said interior portion at a zone located between said first zone of expansion and a point opposite the region encircled by said inturned flange, and closely adjacent the latter.

2. A method of securing a hose fitting to a hose end which method comprises providing the outer end portion of a hose with an encircling exterior tubular element having at one end thereof an inturned radially extending flange so that the face of the flange substantially extends across the end wall of the hose, applying to the same end of the hose a terminal connector having an extension which is longer than the length of said exterior tubular element by inserting said extension as an interior portion into the hose until its inner end is beyond that end of the exterior tubular element farthest from that same end of the hose, thereafter annularly expanding said interior portion along its length and including beyond its average expanded contour an annular groove projecting outwardly in the inner wall of said interior portion and located at a zone between the end thereof and a point intersected by a line drawn from the adjacent end of said exterior tubular portion at right angles to the bore of said hose, and annularly expanding the said interior portion at point opposite the region encircled by said inturned flange, and closely adjacent the latter.

3. A method of securing a hose fitting to a hose end which method comprises providing the outer end portion of a hose with an encircling exterior tubular element having at one end thereof an inturned radially extending flange so that the face of the flange substantially extends across the end wall of the hose, and having at the other end of same where the hose is received a depressed portion to provide an inturned shoulder and an outward and upwardly turned edge to allow by the former a friction contact with the hose end to facilitate by the latter the entrance of the hose into said tubular element, applying to the same end of the hose a terminal connector having an extension which is longer than the length of said exterior tubular element by inserting said extension as an interior portion into the hose until its inner end is beyond that end of the exterior tubular element farthest from that same end of the hose, thereafter annularly expanding said interior portion along its length and compressing the hose between said interior portion and that part of the exterior tubular element which lies between said depressed portion and said inturned flange of said exterior tubular element, and including beyond its average expanded contour the expanding of an annular internal groove and corresponding external bead projecting outwardly in the inner wall of said interior portion and located at a zone between the end thereof and a point intersected by a line drawn from the adjacent end of said exterior tubular portion at right angles to the bore of said hose, and compressing the hose between said outwardly projecting annular groove and the upturned face of said depressed portion, and annularly expanding the said interior portion to form a second annular internal groove and corresponding external bead at a point near the region encircled by said inturned flange, and closely adjacent the latter, to hold said inturned flange in fixed longitudinal position.

4. A method of securing a hose fitting to a hose end, which method comprises providing the outer end portion of a hose with an encircling exterior tubular element having at one end thereof an inturned radially extending flange so that the face of the flange substantially extends across the end wall of the hose, applying to the same end of the hose a terminal connector having an extension which is longer than the length of said exterior tubular element by inserting said extension as an interior portion into the hose until its inner end is beyond that end of the exterior tubular element farthest from said flange, thereafter annularly expanding said interior portion along its length and thereby compressing the hose between said interior portion and said exterior tubular element and including, beyond its average expanded contour, the expanding of an annular groove and corresponding external annular bead to project same outwardly in the inner wall of said interior portion near the end thereof and beyond the end of said exterior element opposite said flange to form a shoulder on the outer wall of said interior portion as a stop against longitudinal movement of said compressed part of the hose and to compress the hose between said shoulder and the adjacent end of said exterior tubular element, and annularly expanding the said interior portion at a point closely adjacent the region encircled by said inturned flange to form a shoulder on the outer wall of said interior portion to lock said exterior tubular element against longitudinal movement, said external bead having an outer dimension greater than any other part of said interior portion at the time said interior portion is fitted into the hose.

5. The method of securing a hose fitting to a hose end, which method comprises providing the outer portion of a hose with an encircling exterior tubular element, applying to the same end of the hose a terminal connector having a cylindrical extension which is longer than the length of said exterior tubular element by inserting said cylindrical extension into the hose until its inner end is beyond that end of the exterior tubular element farthest from that same end of the hose, thereafter annularly expanding said cylindrical extension along its entire length within said hose except for a portion adjacent its inner end; to a substantially uniform cylindrical contour whose inner diameter is substantially equal or greater than the normal inner diameter of said hose, and simultaneously expanding said inner end portion beyond said cylindrical contour to form an annular groove projecting outwardly in the cylindrical inner wall of said cylindrical extension and providing a corresponding external bead in the cylindrical outer wall and located in a zone between the innermost end of said interior portion and a transverse plane intersecting the adjacent end of said exterior tubular portion to provide a bulge in the hose between the adjacent ends of said cylindrical extension and said exterior element.

6. A method of securing a hose fitting to a hose end as set forth in claim 5, which method further includes the step of providing the outer end portion of said exterior tubular element, at the end thereof where the hose is received, with a depressed portion to provide an inturned shoulder, whereby said bulge is compressed between said outwardly projecting annular bead and said inturned shoulder.

LEWEN R. NELSON.